J. J. UNBEHEND,

Assignor, by direct and mesne assignments, to J. L. THOMSON and G. WATKINSON.

SHOE CLASP.

No. 10,573. Reissued Mar. 17, 1885.

ATTEST—

Wm. C. Raymond

F. H. Gibbs

INVENTOR—

Jacob J. Unbehend per Dull, Laass & Hay his Attys.

N. PETERS, Photo-Lithographer, Washington, D. C.

UNITED STATES PATENT OFFICE.

JACOB J. UNBEHEND, OF SYRACUSE, NEW YORK, ASSIGNOR, BY DIRECT AND MESNE ASSIGNMENTS, TO JUDSON L. THOMSON, OF SAME PLACE, AND GEORGE WATKINSON, OF NEW HAVEN, CONNECTICUT.

SHOE-CLASP.

SPECIFICATION forming part of Reissued Letters Patent No. 10,573, dated March 17, 1885.

Original No. 305,410, dated September 16, 1884. Application for reissue filed September 26, 1884.

*To all whom it may concern:*

Be it known that I, JACOB J. UNBEHEND, residing at Syracuse, in the county of Onondaga and State of New York, have invented certain new and useful Improvements in Shoe-Clasps, of which the following, taken in connection with the accompanying drawings, is a full, clear, and exact description.

This invention relates to that class of shoe-clasps in which a spring-actuated tongue interlocks with a slotted plate.

The invention consists in an improved construction of the component parts of the clasp, whereby increased stability is imparted thereto, and the manufacture thereof is simplified and cheapened.

Figure 3:
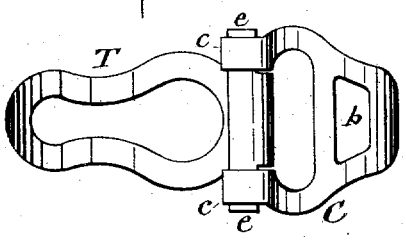
Figure 1:
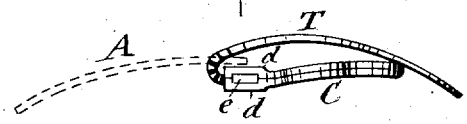
Figure 2:
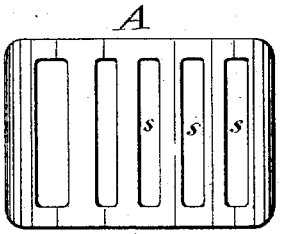
Figure 4:
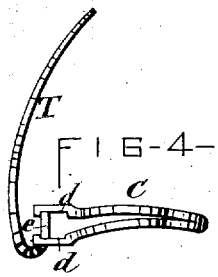
Figure 5:
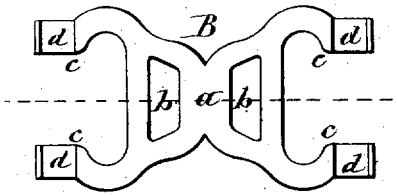
Figure 6:
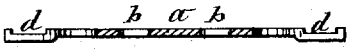
Figure 7:
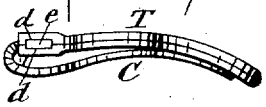

The invention is fully illustrated in the annexed drawings, wherein Figure 1 is an edge view of the clasp interlocked with the slotted companion plate shown in dotted lines. Fig. 2 is a detached plan view of said slotted plate. Fig. 3 is a plan view of the clasp with the tongue thrown off from its attaching-plate to better illustrate the construction of said members. Fig. 4 is an edge view of the clasp with the tongue raised to illustrate the operation of the spring. Fig. 5 is a plan view of the blank from which the attaching-plate of the clasp is formed. Fig. 6 is a longitudinal section of the same, and Fig. 7 is an edge view illustrating modifications of my invention.

Similar letters of reference indicate corresponding parts.

A represents a metal plate provided with transverse slots S S, and adapted to be attached to one of the quarters or straps of the shoe. C is another metal plate designed to be attached to the other quarter or strap of the shoe, and F is the tongue hinged on the attaching-plate C, and adapted to enter one of the slots of the plate A, and thus interlock with said plate, as represented in Fig. 1 of the drawings.

It is the construction of the clasp proper—viz., the plate C and tongue T—which my invention has reference to. This clasp consists, essentially, of two flexible plates connected together at or near one end, and a third plate having angular projections passing between the free ends of the first two plates and constituting the hinge of the tongue. The pressure of the flexible plates on the angular hinge-pin serves to yieldingly hold the tongue in two of its operative positions—viz., standing extended forward from its attaching-plate, as shown in Fig. 3 of the drawings, and lying back upon its attaching-plate for retaining the interlocked plate A, as represented in Fig. 1 of the drawings. In order to manufacture the said clasp in an inexpensive and expeditious manner, I form the attaching-plate C of a spring sheet-metal blank, B, having a solid central portion, *a*, openings *b b* at opposite sides of said central portion, and end extensions, *c c*, having angular or elongated depressions or recesses *d d*, as illustrated in Figs. 5 and 6 of the drawings. This blank I fold across the center once upon itself, so as to bring the two end portions to lie contiguously one upon the other, and with the recesses *d d* between the free ends thereof, said blank being thus converted into two spring leaves or jaws, having between them the aforesaid recesses, into which is extended a corresponding angular or transversely elongated pintle, *e*, formed integral with or otherwise rigidly attached to the tongue T. In raising the free end of said tongue, the pintle *e* thereof is caused to pry apart the free ends of the two spring-jaws, which constitute the attaching-plate of the clasp, as shown in Fig. 4 of the drawings, and the pressure of said jaws on the pintle *e* throws the tongue T either back or forward after it has passed over the center of its movement.

It will be observed that by my improvement I obviate the short bend required on the end of the plate to form the usual round eye or sleeve for the reception of the common hinge-pin, said short bend being difficult to make with the material required for the clasp. The blank B, with the recesses *d d*, is easily stamped out of sheet-steel, and when doubled, as described, completes the combined attaching-plate and spring. I do not, however, limit myself to the described construction of the attaching-plate C and tongue T, as it is obvious that the plate C may consist of a single leaf, and the spring for actuating the tongue can be obtained by forming the tongue of two flexible plates connected together at their free ends, and provided at their opposite ends with the recesses *d d*, for grasping the hinge-pin attached to the plate C, as illustrated in Fig. 7 of the drawings.

What I claim as my invention is—

1. A shoe-clasp composed of two flexible plates connected together at one end, and a third plate hinged at the free ends of the flexible plates and having angular lateral projections extending between the aforesaid ends at opposite edges of the hinged plate, which pry the free ends of the two flexible plates apart when raising the hinged plate or when swinging it back on its hinge.

2. A shoe-clasp composed of two flexible plates lying one upon the other, and connected together at or near one end, and a third plate having angular projections extending between the free ends of the flexible plates, substantially as described, and constituting the hinge of the tongue, in the manner set forth.

3. In a shoe-clasp, the combination of two spring-jaws provided between their vibratory ends with angular or elongated recesses, substantially as described, an angular pintle extending between said recesses, and a tongue attached to said pintle, substantially as set forth and shown.

4. The blank B, formed with the solid central portion, *a*, openings *b b* at opposite sides of the said central portion, and end extensions, *c c*, having recesses *d d*, substantially as described and shown.

JACOB J. UNBEHEND.

Witnesses:
F. H. GIBBS,
WM. C. RAYMOND.